United States Patent
Hazenbroek

[11] Patent Number: 5,865,672
[45] Date of Patent: Feb. 2, 1999

[54] DEBONING DEVICE AND DEBONING APPARATUS FOR PARTIALLY DEBONING MEAT

[75] Inventor: Jacobus E. Hazenbroek, L Klaaswaal, Netherlands

[73] Assignee: Systemate Holland, B.V., Numansdorp, Netherlands

[21] Appl. No.: 7,637

[22] Filed: Jan. 15, 1998

[51] Int. Cl.⁶ .................................................. A22C 17/04
[52] U.S. Cl. ........................................... 452/138; 452/136
[58] Field of Search ..................................... 452/138, 136, 452/135

[56] References Cited

U.S. PATENT DOCUMENTS

| | | |
|---|---|---|
| 3,456,284 | 7/1969 | Werner et al. . |
| 3,672,000 | 6/1972 | Martin et al. . |
| 4,327,463 | 5/1982 | Martin . |
| 4,377,884 | 3/1983 | Viscolosi ................................. 452/138 |
| 4,380,849 | 4/1983 | Adkison et al. . |
| 4,446,600 | 5/1984 | Hooley et al. . |
| 4,488,332 | 12/1984 | Atteck et al. . |
| 4,495,675 | 1/1985 | Hill et al. . |
| 4,736,492 | 4/1988 | Hazenbroek et al. . |
| 4,811,456 | 3/1989 | Heuvel ................................... 452/136 |
| 4,843,682 | 7/1989 | Bowen . |
| 4,882,810 | 11/1989 | Ostholt et al. .......................... 452/136 |
| 4,944,067 | 7/1990 | Kulishen et al. ....................... 452/138 |
| 5,064,403 | 11/1991 | Elsten .................................... 452/135 |
| 5,090,940 | 2/1992 | Adkison ................................. 452/136 |
| 5,277,649 | 1/1994 | Adkison ................................. 452/138 |
| 5,782,685 | 7/1998 | Hazenbroek et al. .................. 452/138 |
| 5,810,653 | 9/1998 | Van Craaikamp et al. ............ 452/136 |

Primary Examiner—Willis Little
Attorney, Agent, or Firm—Thomas, Kayden. Horstmeyer & Risley

[57] ABSTRACT

Deboning device for partially deboning meat surrounding a bone, which deboning device is provided with means for holding partially to be deboned meat, a diaphragm and a pin with a cam, in which the diaphragm and the pin with the cam are placed on either side of the means for holding partially to be deboned meat, and means for moving the pin in a direction towards the diaphragm, so that a bone of meat placed in the means for holding partially to be deboned meat can be pushed by the pin through the diaphragm, in which the deboning device is further provided with a stop for the pin, which stop is placed at a side of the diaphragm which is directed to the means for holding partially to be deboned meat and which stop limits the moving of the pin in the direction of the diaphragm so that a bone of meat placed in the means for holding partially to be deboned meat can only be partially pushed through the diaphragm by the pin and in which the deboning device is further provided with a push-back pin placed on a side of the diaphragm opposite the pin and further with push-back means for moving the push-back pin in a push-back direction towards the diaphragm, so that a bone which extends through the diaphragm can be pushed back entirely by the push-back pin through the diaphragm.

3 Claims, 5 Drawing Sheets

DEBONING DEVICE AND DEBONING APPARATUS FOR PARTIALLY DEBONING MEAT

FIELD OF THE INVENTION

The present invention relates to a deboning device and a deboning apparatus for partially deboning meat surrounding a bone. Said deboning device and apparatus can be used to partially remove meat from wings, thighs and drumsticks.

BACKGROUND OF THE INVENTION

There are deboning devices and apparatus known for fully deboning meat surrounding a bone, such as the so-called "round thigh debonera" models D-30, D-40 and D-50 of the company Systemate Holland B.V. Such a deboning device is provided with means for holding completely to be deboned meat, a diaphragm and a pin with a cam, in which the diaphragm and the pin with the cam are placed on either side of the means for holding the completely to be deboned meat, and means for moving the pin with the cam in a direction towards the diaphragm, so that a bone of meat surrounding a bone placed in the means for holding completely to be deboned meat can be pushed entirely through the diaphragm by the pin with the cam. The meat is detained by the diaphragm so that meat is stripped from the bone.

SUMMARY OF THE INVENTION

It is an object of the present invention to provide a deboning device for partially deboning meat surrounding a bone, with which a so-called "meat lollipop" or a "meat tulip" can be made.

More in particular the present invention provides a deboning device for partially deboning meat surrounding a bone, which deboning device is provided with means for holding partially to be deboned meat, a diaphragm and a pin with a cam, in which the diaphragm and the pin with the cam are placed on either side of the means for holding partially to be deboned meat, and means for moving the pin with the cam in a direction towards the diaphragm, so that a bone of meat surrounding a bone, placed in the means for holding partially to be deboned meat can be pushed through the diaphragm by the pin with the cam, in which the deboning device is further provided with a stop for the pin with the cam, which stop is placed at a side of the diaphragm which is directed to the means for holding partially to be deboned meat and which stop limits the moving of the pin with the cam in the direction towards the diaphragm so that a bone of meat surrounding a bone placed in the means for holding partially to be deboned meat can only be partially pushed through the diaphragm by the pin with the cam and in which the deboning device is further provided with a push-back pin placed on the side of the diaphragm opposite the pin with the cam and further with push-back means for moving the push-back pin in a push-back direction towards the diaphragm, so that a bone of meat partially surrounding a bone and which extends through the diaphragm can be pushed back entirely by the push-back pin through the diaphragm.

Preferably the stop is placed such that the bone for ¾ of its length can be pushed through the diaphragm. Although the position of the stop can be determined by experiment per kind of meat, it appeared that, in particular with chicken, a most manageable "chicken tulip" is obtained when the bone has been stripped of meat for ¾.

Furthermore the present invention provides a deboning apparatus in which a number of deboning devices according to the invention are placed around a partially conical drum, because of which a great number of pieces of meat can be processed per minute by one apparatus.

BRIEF DESCRIPTION OF THE DRAWINGS

The present invention will now be described by way of example on the basis of the drawing. In this drawing.

DETAILED DESCRIPTION

Figure 1:
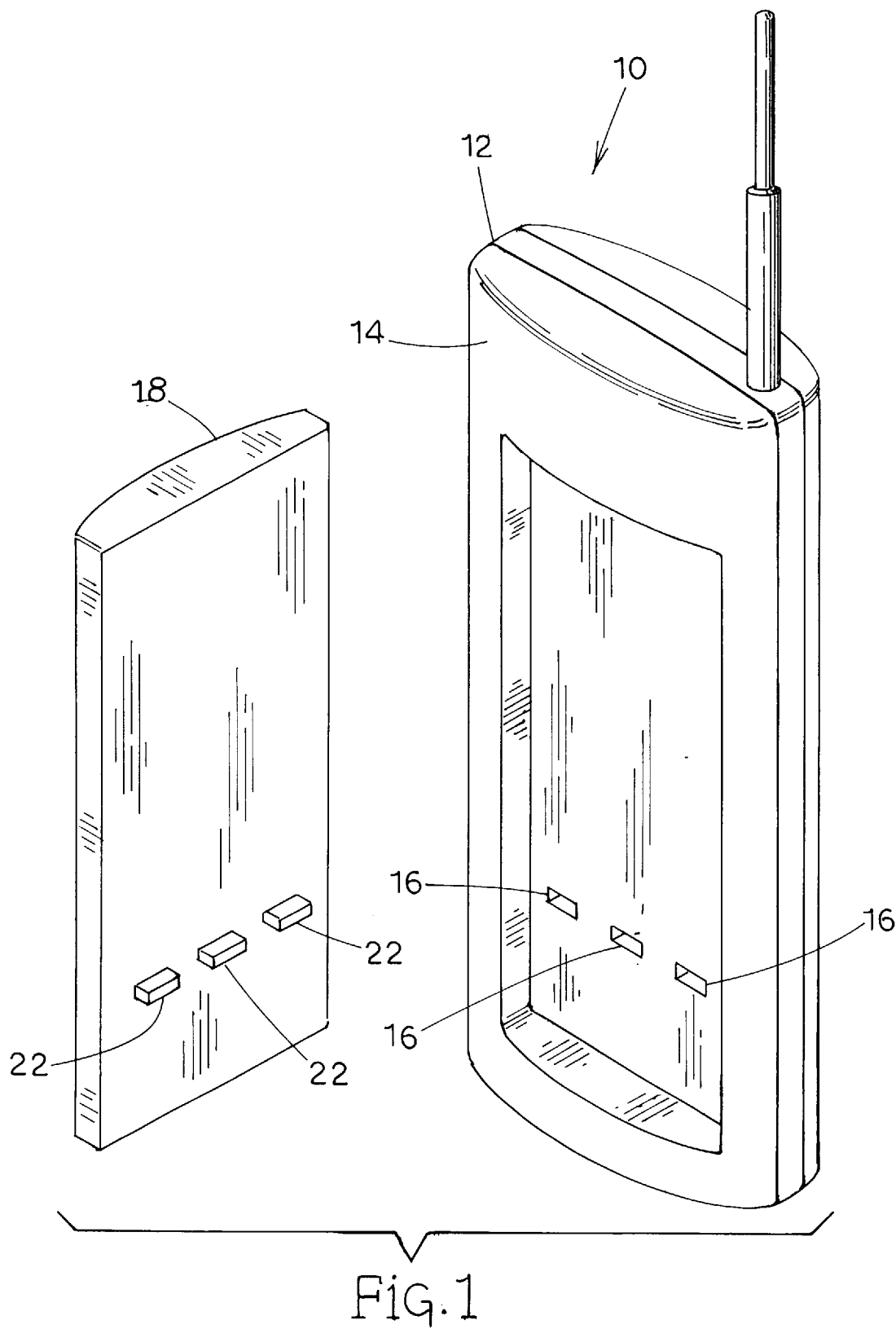
FIG. 1 shows a schematical view, partly in cross-section, of a deboning apparatus for partially deboning meat according to the invention.

In FIG. 1 a deboning apparatus 1 according to the invention is shown schematically in view, partly in cross-section, in which a plurality, for instance 8, 12 or 16, deboning devices 2, are placed around a partially conical drum 3.

Each deboning device 2 for partially deboning meat surrounding a bone is provided with means 4 for holding partially to be deboned meat. These means 4 are for instance formed by two plates which can pivot towards and away from each other, between which the partially to be deboned meat can be clamped. In FIG. 1 in the deboning device 2 shown on the right the plates are drawn in the position in which they are moved towards each other.

Furthermore each deboning device 2 has a diaphragm 5 and a pin 6 with a cam 7, in which the diaphragm 5 and the pin 6 with the cam 7 are placed on either side of the means 4 for partially to be deboned meat. Means 8 are provided for moving the pin 6 with the cam 7 in a direction towards the diaphragm 5, so that the bone of the meat surrounding a bone, placed on the means 4 for holding partially to be deboned meat can be pushed through the diaphragm 5 by the pin 6 with the cam 7. The means 8 can be formed by a hydraulically, pneumatically or electrically operated cylinder with an end which engages the cam 7 of the pin 6. The means 8 can in an alternative embodiment also engage the pin itself, although it is constructionally advantageous to use the cam. Each deboning device 2 can be provided with its own means for moving the pin with the cam, but in a deboning apparatus according to the invention it is preferred that only one means 8 is used for all deboning devices. By rotation of the drum 3 the respective deboning devices are placed under the means 8. Alternatively the means for moving the pin can be formed by a curve track.

Each deboning device 2 is further provided with a stop 9 for the pin 6 with the cam 7, which stop 9 is placed at a side of the diaphragm 5 which is directed to the means 4 for holding partially to be deboned meat. This stop 9 limits the moving of the pin 6 with the cam 7 in the direction towards the diaphragm 5 so that a bone of meat surrounding a bone, placed in the means 4 for holding partially to be deboned meat can only be partially pushed through the diaphragm 5 by the pin 6 with the cam 7.

Each deboning device 2 is furthermore provided with a push-back pin 10 placed on the side of the diaphragm 5 opposite the pin 6 with the cam 7. Furthermore push-back means 11 are provided for moving the push-back pin 10 in a push-back direction towards the diaphragm 5, so that a bone of meat partially surrounding a bone and which extends through the diaphragm 5 can be pushed back entirely by the push-back pin 10 through the diaphragm 5.

The means 11 can be formed by a hydraulically, pneumatically or electrically operated cylinder with an end which engages the push-back pin 10. The means 11 can in an alternative embodiment also engage a cam on the push-back pin, although this appears to be unnecessary from a constructional point of view. Each deboning device 2 can be provided with its own means for moving the push-back pin, but in a deboning apparatus according to the invention it is preferable that only one means 11 is used for all deboning devices. By rotation of drum 3 all respective deboning devices are placed under the means 11. Alternatively the means for moving the push-back pin can be formed by a curve track.

Figure 2:
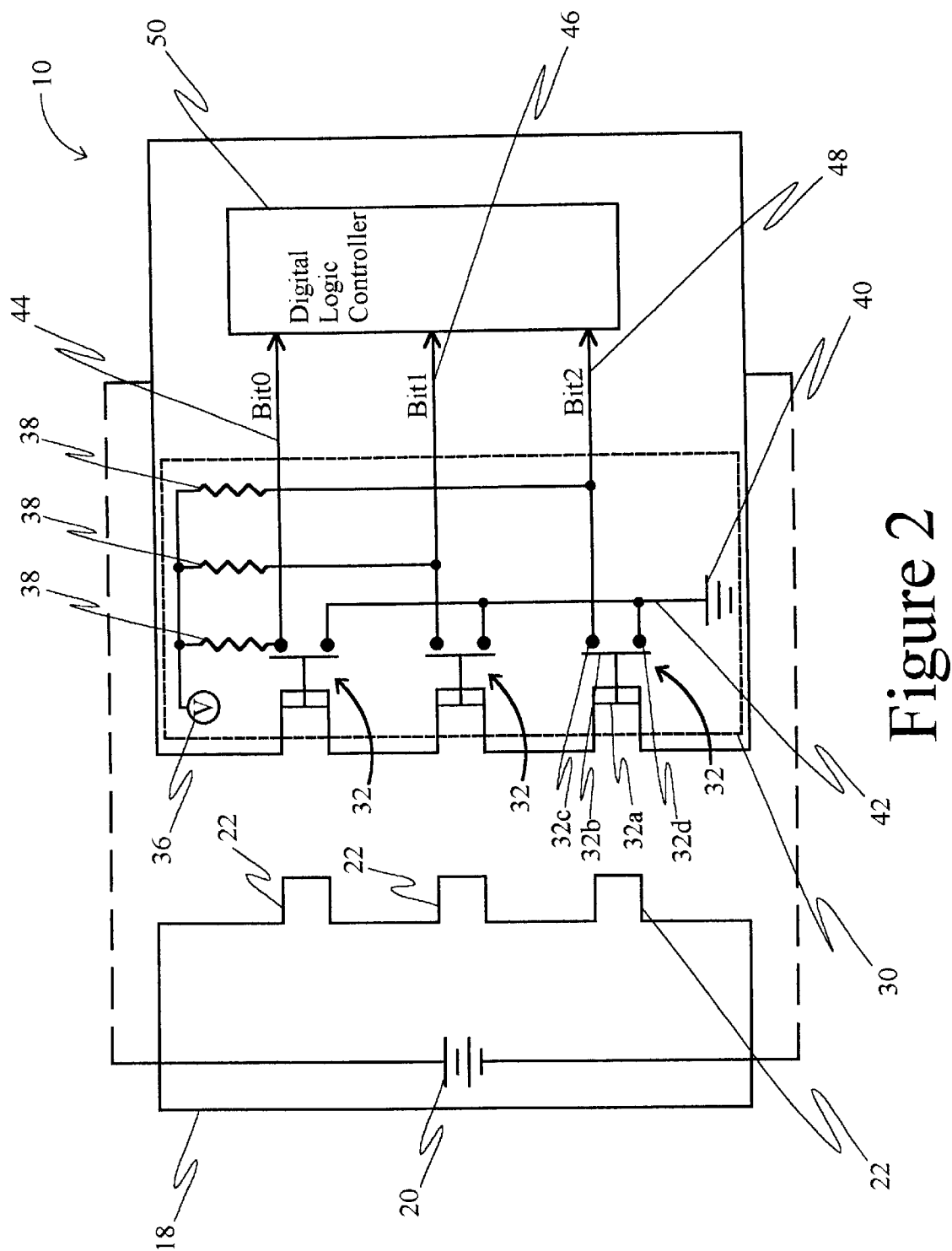
FIGS. 2–5 show schematically in cross-section a deboning device for partially deboning meat, in which the pin and the push-back pin are in various positions.
Figure 3:
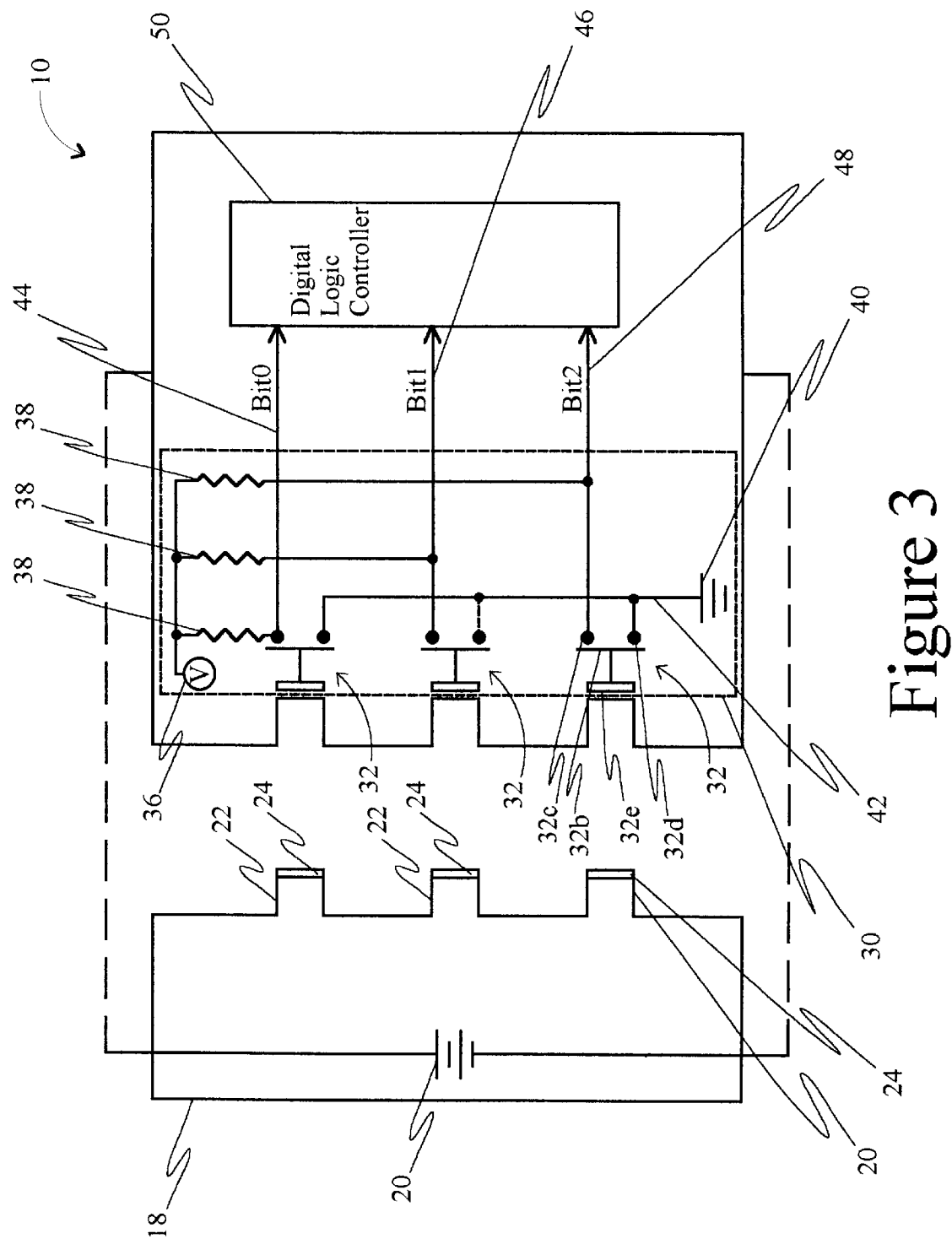
Figure 4:
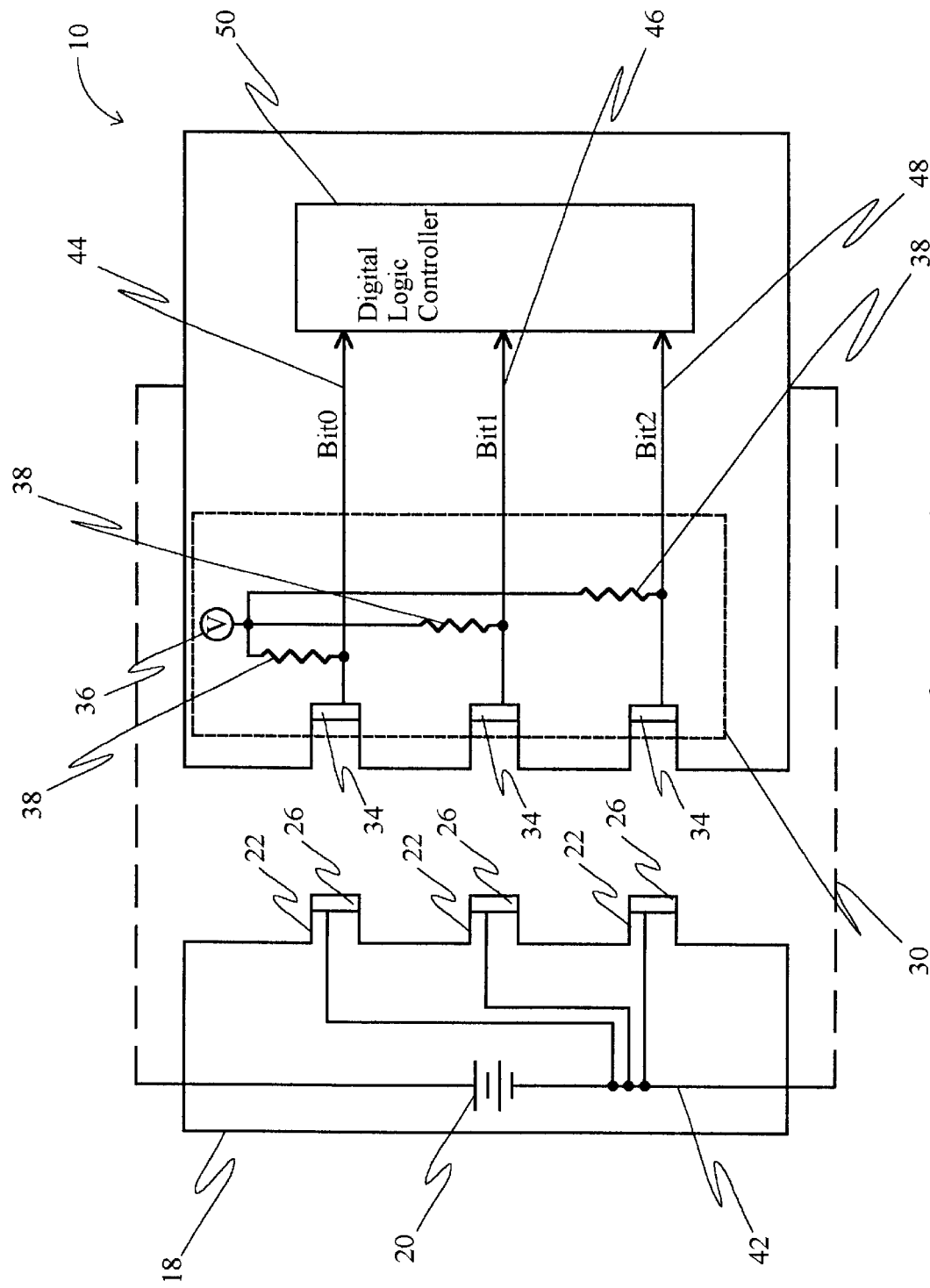
Figure 5:
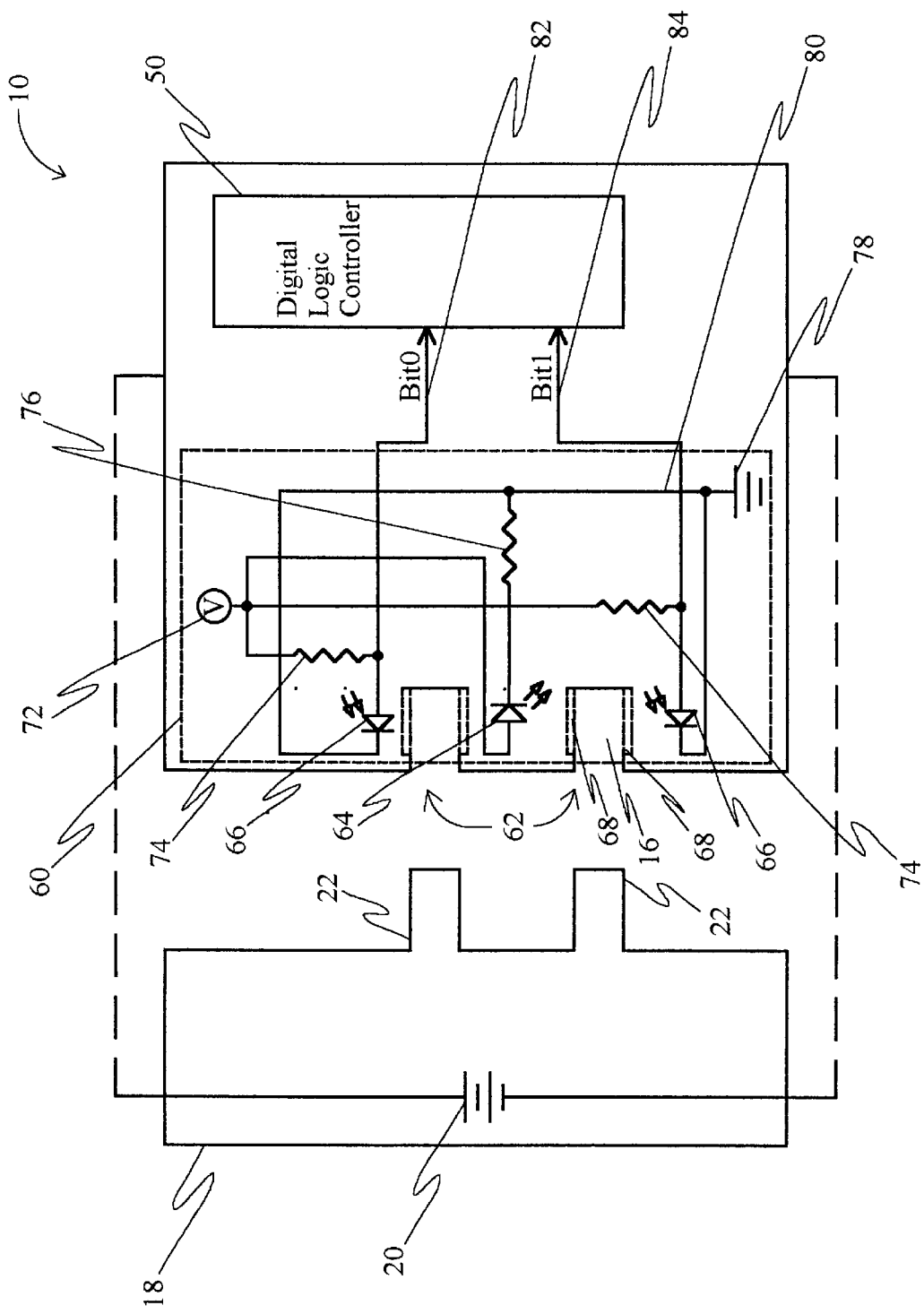

In FIGS. 2–5 a deboning device for partially deboning meat is shown schematically in cross-section, in which the pin 6 and the push-back pin 10 are in various positions. FIG. 2 shows the starting position, in which meat is placed in means (for simplicity's sake not shown in the drawing) for holding meat. FIG. 3 shows the position in which pin 6 is pushed in the direction towards the diaphragm until the stop 9 makes further movement impossible. This results in the bone being pushed through the diaphragm whereas the meat is detained by the diaphragm. The place of the stop 9 can be adjusted by experiment. In particular with chicken, it is preferable that the stop is placed such that the bone for ¾ of its length can be pushed through the diaphragm. In FIG. 4 the position is shown in which the pin 6 is moved back to the starting position. Finally in FIG. 5 the position is shown in which the push-back pin 10 pushes back the bone through the diaphragm 5, so that it can be removed from the deboning device for further processing.

The meat is processed in such a way by the deboning device and deboning apparatus according to the invention that a last action, for instance a manual action, in which the meat which is cut loose from the bone is folded back over the meat which is still attached to the bone, resulting in a lollipop-like meat snack, demands little effort.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. A deboning device for partially deboning meat surrounding a bone, said deboning device comprising:

means for holding meat to be partially deboned;

a diaphragm and a pin with a cam, in which said diaphragm and said pin with said cam are placed on either side of said holding means;

means for moving said pin with said cam in a direction towards said diaphragm, so that a bone with meat surrounding the bone placed in said holding means can be pushed through said diaphragm by said pin with said cam;

a stop for said pin with said cam placed at a side of said diaphragm which is directed to said means for holding the meat to be partially deboned, said stop limiting the movement of said pin with said cam in the direction towards said diaphragm so that the bone is partially pushed through said diaphragm by said pin with said cam; and a push-back pin placed on a side of the diaphragm opposite the pin with the cam for moving the push-back pin in a direction towards said diaphragm, so that the bone which extends through the diaphragm can be pushed back entirely by the push-back pin through the diaphragm.

2. A deboning device according to claim 1, in which the stop is placed such that the bone for ¾ of its length can be pushed through the diaphragm.

3. A deboning device according to claim 1 in which a plurality of deboning devices are placed around a partially conical drum.

* * * * *

UNITED STATES PATENT AND TRADEMARK OFFICE
CERTIFICATE OF CORRECTION

PATENT NO. : 5,865,672
DATED : Feb. 2, 1999
INVENTOR(S) : Jacobus E. Hazenbroek

It is certified that error appears in the above-identified patent and that said Letters Patent is hereby corrected as shown below:

The Title page should be deleted and substitute therefor the attached title page.

The drawing sheets consisting of Figs. 1-5, should be deleted to be replaced with the drawing sheets consisting of Figs. 1-5, as shown on the attached pages.

Signed and Sealed this

Seventeenth Day of August, 1999

Attest:

Q. TODD DICKINSON

*Attesting Officer*   *Acting Commissioner of Patents and Trademarks*

United States Patent [19]
Hazenbroek

[11] Patent Number: 5,865,672
[45] Date of Patent: Feb. 2, 1999

[54] DEBONING DEVICE AND DEBONING APPARATUS FOR PARTIALLY DEBONING MEAT

[75] Inventor: Jacobus E. Hazenbroek, L Klaaswaal, Netherlands

[73] Assignee: Systemate Holland, B.V., Numansdorp, Netherlands

[21] Appl. No.: 7,637

[22] Filed: Jan. 15, 1998

[51] Int. Cl.⁶ .................................................. A22C 17/04
[52] U.S. Cl. .................................. 452/138; 452/136
[58] Field of Search ........................ 452/138, 136, 452/135

[56] References Cited

U.S. PATENT DOCUMENTS

| | | |
|---|---|---|
| 3,456,284 | 7/1969 | Werner et al. |
| 3,672,000 | 6/1972 | Martin et al. |
| 4,327,463 | 5/1982 | Martin |
| 4,377,884 | 3/1983 | Viscolosi ............... 452/138 |
| 4,380,849 | 4/1983 | Adkison et al. |
| 4,446,600 | 5/1984 | Hooley et al. |
| 4,488,332 | 12/1984 | Atteck et al. |
| 4,495,675 | 1/1985 | Hill et al. |
| 4,736,492 | 4/1988 | Hazenbroek et al. |
| 4,811,456 | 3/1989 | Heuvel ................... 452/136 |
| 4,843,682 | 7/1989 | Bowen |
| 4,882,810 | 11/1989 | Ostholt et al. ........... 452/136 |
| 4,944,067 | 7/1990 | Kulishen et al. ........ 452/138 |
| 5,064,403 | 11/1991 | Elsten .................... 452/135 |
| 5,090,940 | 2/1992 | Adkison ................. 452/136 |
| 5,277,649 | 1/1994 | Adkison ................. 452/138 |
| 5,782,685 | 7/1998 | Hazenbroek et al. .... 452/138 |
| 5,810,653 | 9/1998 | Van Craaikamp et al. ... 452/136 |

Primary Examiner—Willis Little
Attorney, Agent, or Firm—Thomas, Kayden, Horstmeyer & Risley

[57] ABSTRACT

Deboning device for partially deboning meat surrounding a bone, which deboning device is provided with means for holding partially to be deboned meat, a diaphragm and a pin with a cam, in which the diaphragm and the pin with the cam are placed on either side of the means for holding partially to be deboned meat, and means for moving the pin in a direction towards the diaphragm, so that a bone of meat placed in the means for holding partially to be deboned meat can be pushed by the pin through the diaphragm, in which the deboning device is further provided with a stop for the pin, which stop is placed at a side of the diaphragm which is directed to the means for holding partially to be deboned meat and which stop limits the moving of the pin in the direction of the diaphragm so that a bone of meat placed in the means for holding partially to be deboned meat can only be partially pushed through the diaphragm by the pin and in which the deboning device is further provided with a push-back pin placed on a side of the diaphragm opposite the pin and further with push-back means for moving the push-back pin in a push-back direction towards the diaphragm, so that a bone which extends through the diaphragm can be pushed back entirely by the push-back pin through the diaphragm.

3 Claims, 5 Drawing Sheets

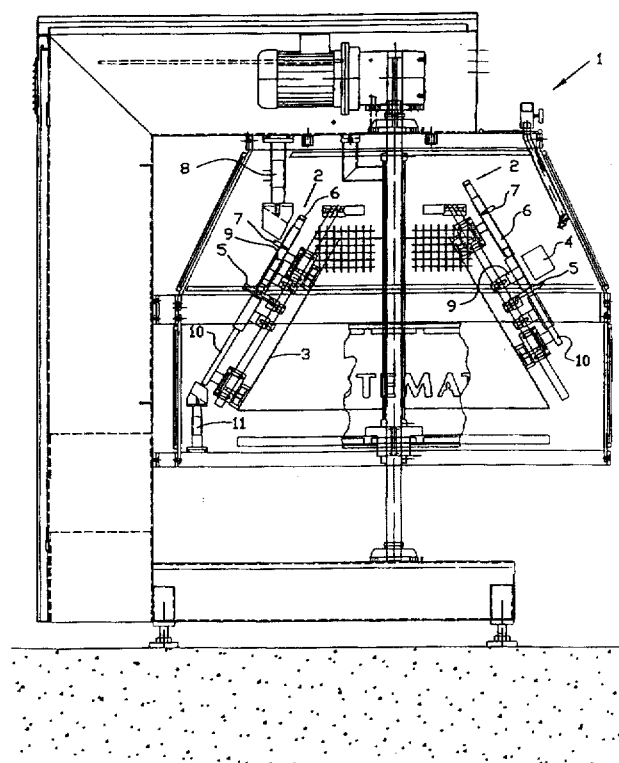

UNITED STATES PATENT AND TRADEMARK OFFICE
CERTIFICATE OF CORRECTION

PATENT NO. : 5,865,672
DATED : Feb. 2, 1999
INVENTOR(S) : Jacobus E. Hazenbroek

Page 3 of 5

It is certified that error appears in the above-identified patent and that said Letters Patent is hereby corrected as shown below:

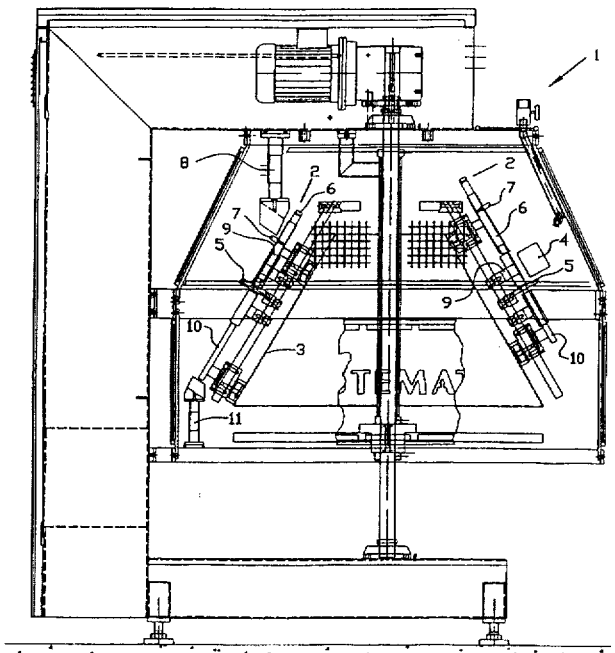

FIG. 1

UNITED STATES PATENT AND TRADEMARK OFFICE
CERTIFICATE OF CORRECTION

PATENT NO. : 5,865,672
DATED : Feb. 2, 1999
INVENTOR(S) : Jacobus E. Hazenbroek

Page 4 of 5

It is certified that error appears in the above-identified patent and that said Letters Patent is hereby corrected as shown below:

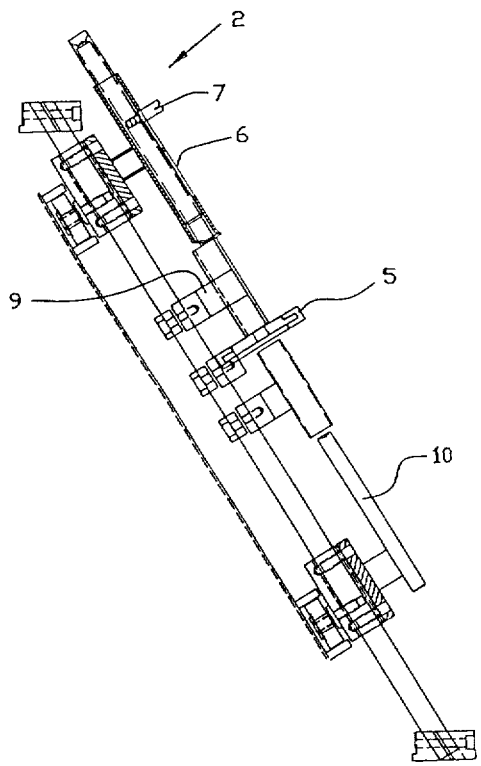

FIG. 2

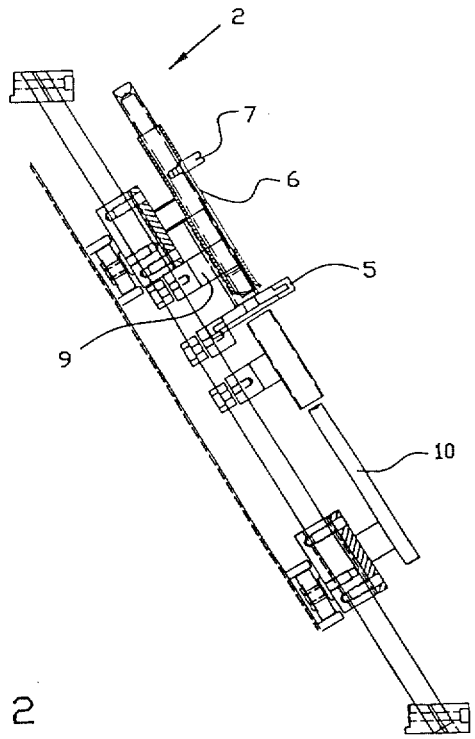

FIG. 3

UNITED STATES PATENT AND TRADEMARK OFFICE
CERTIFICATE OF CORRECTION

PATENT NO. : 5,865,672
DATED : Feb. 2, 1999
INVENTOR(S) : Jacobus E. Hazenbroek

It is certified that error appears in the above-identified patent and that said Letters Patent is hereby corrected as shown below:

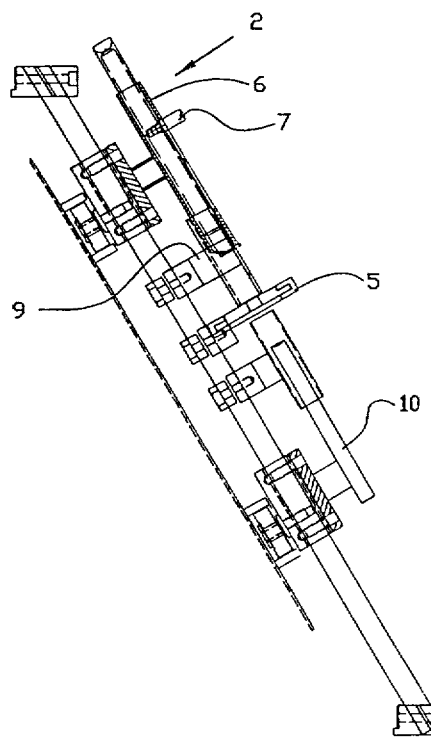

FIG. 4

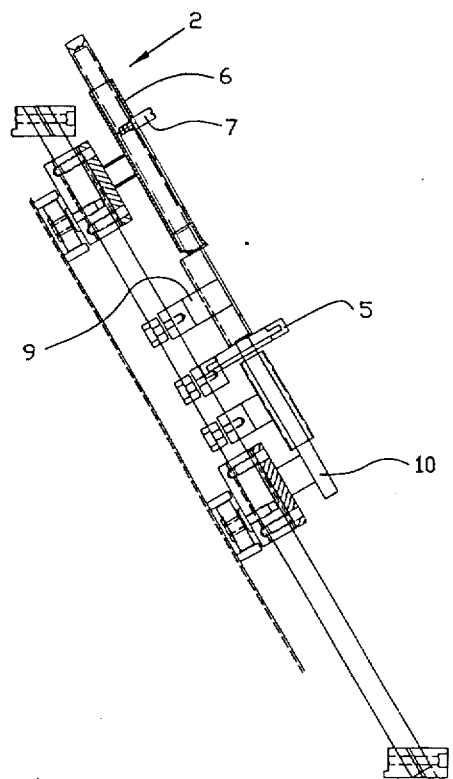

FIG. 5